(12) United States Patent
Park et al.

(10) Patent No.: US 9,810,910 B1
(45) Date of Patent: *Nov. 7, 2017

(54) CONTACT LENS WITH PHASE MAP DISPLAY

(71) Applicant: VERILY LIFE SCIENCES LLC, Mountain View, CA (US)

(72) Inventors: Sohyun Park, Sunnyvale, CA (US); Igor Landau, Boulder, CO (US)

(73) Assignee: Verily Life Sciences LLC, Mountain View, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 14/724,173

(22) Filed: May 28, 2015

(51) Int. Cl.
*A61B 3/10* (2006.01)
*G02C 5/00* (2006.01)
(Continued)

(52) U.S. Cl.
CPC .......... *G02B 27/0172* (2013.01); *G02C 7/048* (2013.01); *G02C 11/10* (2013.01); *G02C 2202/16* (2013.01)

(58) Field of Classification Search
CPC .......... B43L 13/18; G03H 1/08; G03H 1/202; G02C 13/005; G02C 7/046; G02C 5/00; G02C 7/02; G02C 7/04; G02C 2202/20; A61B 3/103; A61B 3/14; A61B 3/107; A61B 3/1015; G02B 27/0172; G02B 27/0149; G02B 27/145; G02B 27/143; G02B 27/0025; G02B 27/144; G02B 27/1013; G02B 3/0056; G02B 5/045; G02B 27/0103; G02B 5/32; G11B 7/0065

USPC ........ 359/630–639, 404, 407, 409–410, 359/618–619, 625, 13–14, 727, 732, 359/9–11, 29–32, 35; 356/124–127, (Continued)

(56) References Cited

U.S. PATENT DOCUMENTS 8,446,341 B2 5/2013 Amirparviz et al.
2007/0236769 A1* 10/2007 Zalevsky .............. A61F 2/16
                                                    359/238
(Continued)

FOREIGN PATENT DOCUMENTS

WO WO 2013/086078 A1 6/2013
WO WO 2014/151877 A1 9/2014
WO WO 2014/155288 A2 10/2014

OTHER PUBLICATIONS

U.S. Appl. No. 14/724,095, filed May 28, 2015, Park et al.
Final Office Action dated Jul. 28, 2017 from U.S. Appl. No. 14/985,305, filed Dec. 30, 2015, 21 pages.

*Primary Examiner* — Dawayne A Pinkney
(74) *Attorney, Agent, or Firm* — Christensen O'Connor Johnson Kindness PLLC

(57) ABSTRACT

A contact lens includes a transparent material, a substrate material, a light source, an optical system, and a phase map. The transparent material has an eye-side opposite an external side. The eye-side is curved to fit the human eye. The light source is configured to emit illumination light. The optical system is configured to receive the illumination light from the light source and output the illumination light as an in-phase wavefront. The phase map is configured to adjust a phase of the in-phase wavefront to form an image at a retina-distance in response to being illuminated by the in-phase wavefront. The phase map is pre-recorded with a phase pattern that is included in the image.

20 Claims, 11 Drawing Sheets

(51) Int. Cl.
*G02C 7/02* (2006.01)
*G02B 27/14* (2006.01)
*G03H 1/00* (2006.01)
*G02B 27/01* (2006.01)
*G02C 11/00* (2006.01)
*G02C 7/04* (2006.01)

(58) Field of Classification Search
USPC ......... 356/457–458, 484–490; 351/204–206,
351/211–212, 246–247, 219, 41, 159.01,
351/159.02, 159.03, 159.1, 159.11,
351/159.14, 159.25, 159.26, 159.28,
351/159.39, 160 R
See application file for complete search history.

(56) References Cited

U.S. PATENT DOCUMENTS

| | | |
|---|---|---|
| 2010/0283774 A1 | 11/2010 | Bovet et al. |
| 2010/0296143 A1 | 11/2010 | Reichelt et al. |
| 2012/0105310 A1 | 5/2012 | Sverdrup et al. |
| 2012/0199995 A1 | 8/2012 | Pugh et al. |
| 2013/0222384 A1 | 8/2013 | Futterer |
| 2013/0265622 A1 | 10/2013 | Christmas et al. |
| 2014/0002911 A1* | 1/2014 | Peloux .................... G02B 3/08 359/741 |
| 2014/0049451 A1 | 2/2014 | Sugiyama et al. |
| 2014/0118829 A1* | 5/2014 | Ma ...................... G02B 5/1885 359/567 |
| 2014/0368812 A1 | 12/2014 | Humphrey et al. |
| 2015/0005604 A1* | 1/2015 | Biederman ............. G02C 7/04 600/347 |

* cited by examiner

CONTACT LENS WITH PHASE MAP DISPLAY

TECHNICAL FIELD

The present application is related to a U.S. Application entitled "Near-eye Display with Phase Map," U.S. application Ser. No. 14/724,095, filed on the same day.

TECHNICAL FIELD

This disclosure relates generally to near-eye displays, and in particular to contact lenses that include phase map displays.

BACKGROUND INFORMATION

Near-eye displays are wearable devices that form a display image in a wearer's field of view. Near-eye displays have numerous practical and leisure applications. Aerospace applications permit a pilot to see vital flight control information without taking their eye off the flight path. Public safety applications include tactical displays of maps and thermal imaging. Other application fields include video games, transportation, and telecommunications.

Since near-eye displays are wearables, improvements in power consumption and form factor are highly desirable. Conventional near-eye displays often include a micro-display and an image relay that includes lenses and/or mirrors to direct the images generated by the micro-display to the eye of a wearer of the near-eye display. These various optical components add bulk to the near-eye display. Furthermore, the optical components must be fabricated with very tight manufacturing tolerances and also be precisely aligned to maintain the fidelity of the image generated by the micro-display. The optical components must also be designed to maintain the colors of the image as the image light propagates through the image relay. Therefore, a near-eye display that reduces the bulk, power consumption, and optical fidelity requirements of existing near-eye displays is desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of near-eye displays that include phase maps and systems that include near-eye displays are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
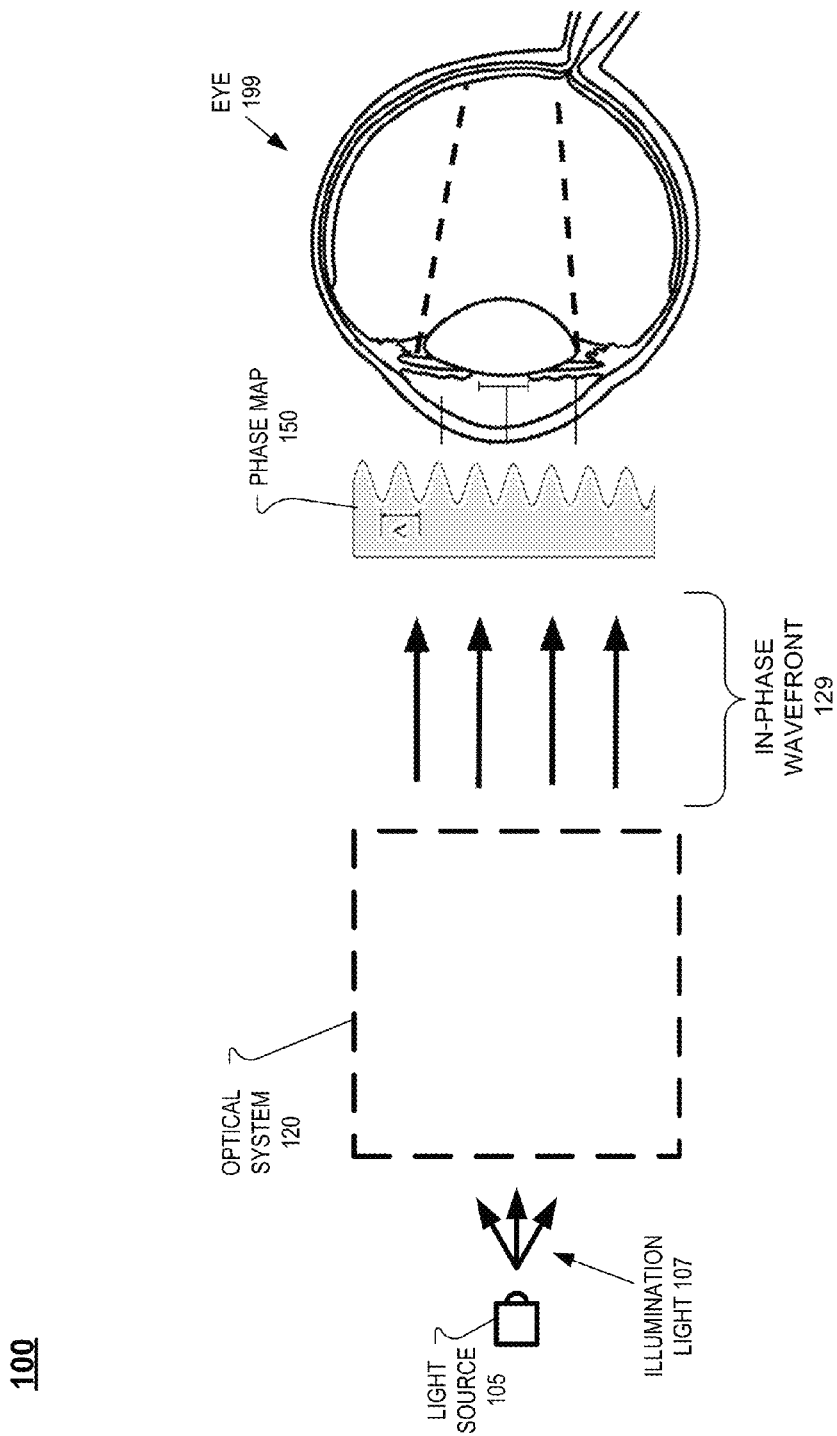
FIGS. 1A and 1B illustrate an example near-eye display that includes a phase map, in accordance with an embodiment of the disclosure.

FIG. 1A illustrates an example near-eye display 100 that includes a phase map 150, in accordance with an embodiment of the disclosure. Near-eye display 100 includes a light source 105, optical system 120, and phase map 150. In one embodiment, light source 105 is a laser diode that emits visible narrow-band (e.g. 1-2 nm) light. In another embodiment, light source 105 is a light-emitting-diode ("LED") that emits broader spectrum (e.g. 50 nm band) colored light. The LEDs may be red, green, or blue, for example. In one embodiment, light source 105 is a monochromatic green LED.

Optical system 120 may include various optical components such as diffractive and refractive lenses, mirrors, filters, and collimators, depending on the specific requirements of the near-eye display. Optical system 120 is configured to receive illumination light 107 emitted by light source 105 and output the illumination light as in-phase (coherent) wavefront 129. Although in-phase wavefront 129 is coherent, it may not necessarily be collimated. In other words, in-phase wavefront 129 may be diverging or converging, in some embodiments. In other embodiments, in-phase wavefront 129 may be both coherent and collimated. Optical system 120 is configured to illuminate phase map 150 with in-phase wavefront 129.

Figure 1B:
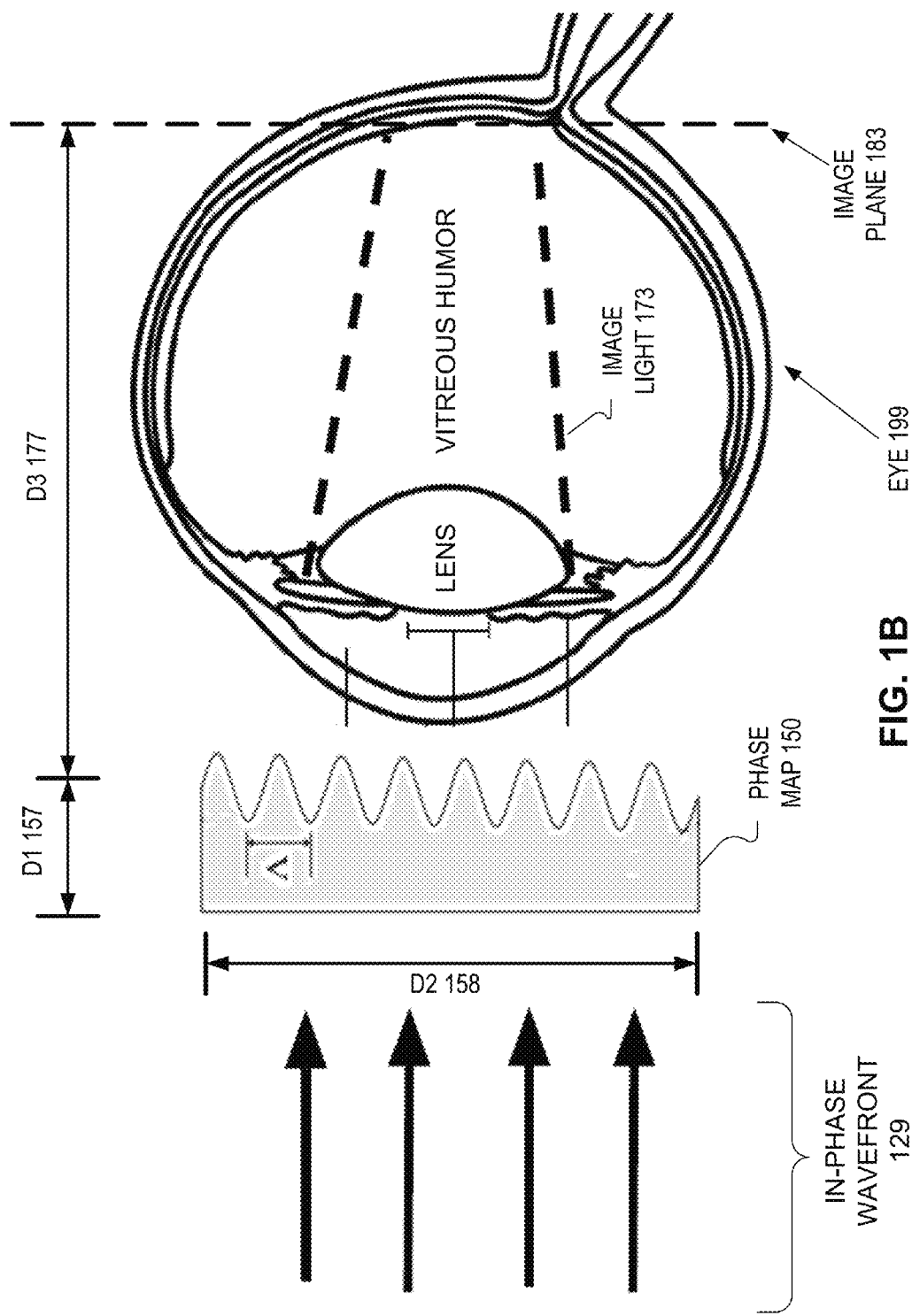
Figure 3A:
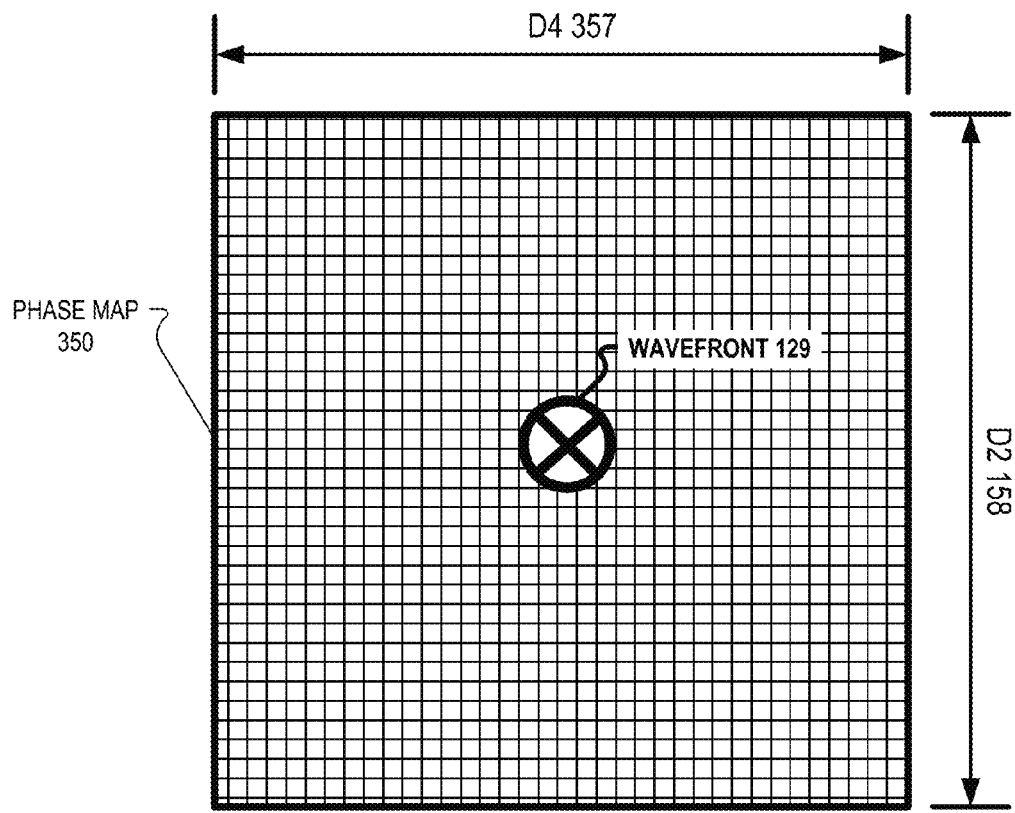
FIG. 3A illustrates an example phase map, in accordance with an embodiment of the disclosure.

Phase map 150 is an optical element configured to adjust a phase of in-phase wavefront 129 to form an image from the phase map at a retina-distance when phase map 150 is illuminated by in-phase wavefront 129. In other words, phase map 150 is pre-recorded with a phase pattern to scatter in-phase wavefront 129 as image light 173 to form a real image directly onto the retina of a human eye. For the purposes of the disclosure, retina-distance will be defined as the distance between the phase map and the retina of a human eye. In one embodiment, the retina distance is less than 30 mm which is less than the nearest focusing capability of the human eye. FIG. 1B shows a zoomed-in side view illustration of phase map 150 and eye 199. The disclosed phase maps are a made of a transparent material, in the illustrated embodiments. The disclosed phase maps are not active reflective spatial modulators found in Liquid Crystal on Silicon (LCOS) technologies. Dimension D1 157 shows the depth of phase map 150 and dimension D2 158 shows the length of phase map 150. FIG. 3A shows a plan view of pixelated phase map 150 where phase map 350 is dimension D4 357 wide and dimension D2 158 long. In one embodiment, dimension D1 157 is 1 nm, dimension D2 158 is 1 mm, and dimension D4 357 is 1 mm.

In FIG. 3A, phase map 350 includes an array of transparent pixels arranged in rows and columns. In one embodiment, phase map 350 includes a 1000×1000 array of pixels where each pixel is 1 μm by 1 μm and phase map 350 is 1 mm in length (D2)×1 mm in width (D4). The pixels may be between 0.1 μm and 40 μm, in some embodiments. The pixel size may also be referred to as "phase period." In one embodiment, the pixel pitch (dimension between pixels) is non-uniform. The phase of each pixel in the array of pixels can be adjusted such that the phase of photons from in-phase wavefront 129 that encounter the pixel is changed by advancing or retarding (slowing down) the photons incident on the pixel relative to the phase of wavefront 229 passing through other pixels. In the illustrated embodiment of FIGS. 1A and 1B, in-phase wavefront 129 propagates orthogonal to the plane of phase map 150. In FIG. 3A, wavefront 129 is illustrated as an arrow propagating into the page, although wavefront 129 may be incident a phase map at different angles beside orthogonal to the plane of the phase map. Cumulatively, varying the phase in pixels of the array of pixels in phase map 350 will diffract wavefront 129 to generate an image when the phase map is illuminated with wavefront 129.

Figure 3B:
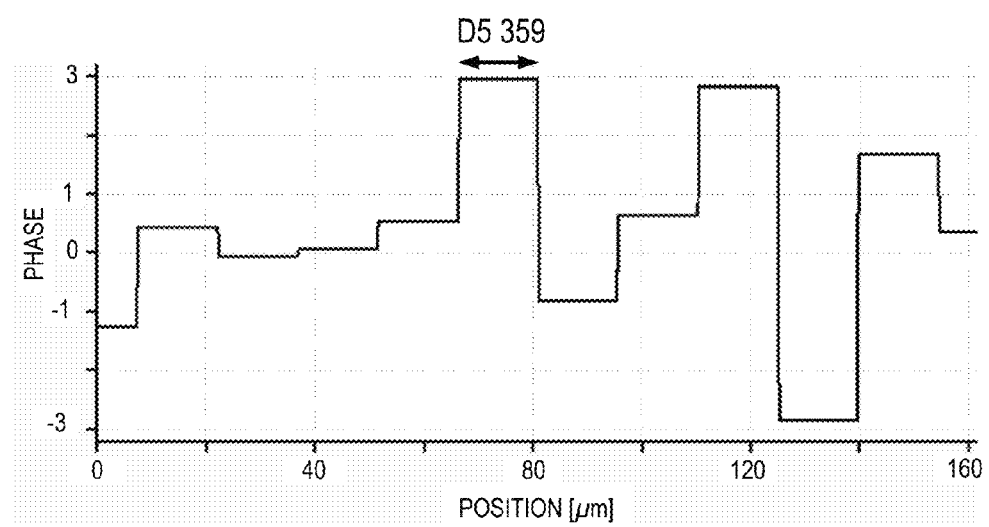
FIG. 3B illustrates phase levels of a portion of the pixels in the phase map illustrated in FIG. 3A, in accordance with an embodiment of the disclosure.

One way to adjust the phase of each pixel is to vary the depth of the pixel. Adjusting the depth of a refractive medium (e.g. transparent polymer) of each pixel changes the length of the optical path that light travels—and hence adjusts the phase. FIG. 3B shows a cross section of ten pixels in phase map 350 where the depth of the pixels has been adjusted according to the phase pattern corresponding to the image. Each pixel has been set according to a discrete phase level. In one embodiment, the phase pattern has eight discrete phase levels that the pixels can be adjusted to. In other words, the depth of the refractive medium for each pixel can have one of eight different depths. In other embodiments, the phase pattern has three or four discrete phase levels. For generating horizontally or vertically symmetrical images, two discrete phase levels may be sufficient for pixels of the phase pattern. An increased number of discrete phase levels generally corresponds to increased image quality. Although FIG. 3B illustrates discrete phase levels with sharp edges between each pixel, full grey-scale (i.e. continuous) variation of the phase levels is achievable.

Figure 3C:
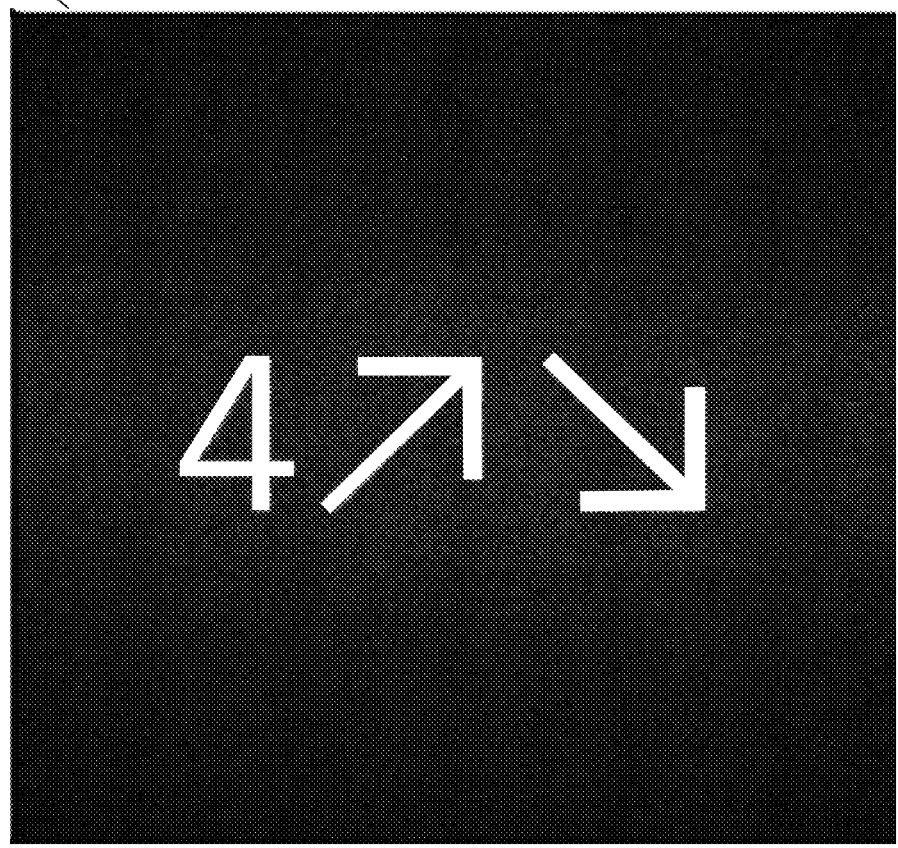
FIG. 3C illustrates an image generated by a phase map, in accordance with an embodiment of the disclosure.

The different phase levels of the pixels are engineered to diffract wavefront 129 to form an image such as image 383 in FIG. 3C. Engineering the desired diffraction may include engineering the pixels to diffract wavefront 129 at different orders of diffraction to form image 383. Once the pixels are engineered for the desired image 383, the pixel pattern that generates image 383 is pre-recorded into the phase map so that phase map 150 will generate image 383 on the retina when phase map 150 is illuminated with wavefront 129. Image 383 includes the number "4" and two arrows. One arrow points in a northeast direction and one arrow points in a southeast direction.

Referring back to FIG. 1B, dimension D3 177 is the retina-distance between phase map 150 and image plane 183, which is targeted to be the retina of eye 199. The optical distance between phase map 150 and the retina is an important distance to define in order to engineer phase map 150 to form an image on the retina. The internal eye optical distance between the retina and the corneal surface at the front of the eye (taking into the account the differing indices of refractions of the cornea and intervening elements such as the lens and vitreous humor of an eye) is well documented. Therefore, adding the optical distance that the phase map will be offset from the cornea to the internal eye optical distance will give the total optical distance between the phase map and image plane 183. The total optical distance may be within a range to take into account differences in eye sizes. If phase map 150 is disposed in a contact lens, the optical distance between the cornea and phase map 150 may be very small (e.g. 1 mm or less). If phase map 150 is included in a head mounted display ("HMD"), phase map 150 may be disposed 2-30 mm (or more) from the cornea.

Once the target total optical distance between the retina and the phase map is defined, the input phase information (phase pattern) to generate an image to be coded onto phase map 150 can be calculated using published algorithms or commercial optics software. After the initial calculation of the phase map, the phase map can be altered iteratively by utilizing inverse Fourier Transforms that converts the amplitude domain to the phase domain. Input parameters for calculating the phase information to be pre-recorded in phase map 150 may include, target total optical distance, the size (length, width, and depth) of the phase map, the spectral properties (wavelength) of in-phase wavefront 129, the size of the desired real image on the retina, the integer number of phase levels to be utilized in the phase map, and the number of pixels and pixel spacing (phase period) of pixels in the phase map. The spectral properties of wavefront 129 are useful to engineer the pixel pattern that generates image 383 because the diffractive pattern of the pixels is tuned to certain wavelengths, in some embodiments. The spectral properties of the in-phase wavefront may be the same as the emission (illumination light 107) of light source 105. The size of the desired image on the retina is related to the Field of View that the image will take up. In one embodiment, it is desirable for the image formed on the retina to be approximately 20% of a Field of View of the user/wearer of the near-eye display 100.

With the input parameters recited above, near-eye display 100 can be modeled by commercial software and the phase map can be iteratively adjusted (using iterative inverse Fourier Transforms) to improve the image generated by the phase map. VirtualLab™ by LightTrans GmbH of Jena Germany is one software suite that could model near-eye display 100.

Figure 2:
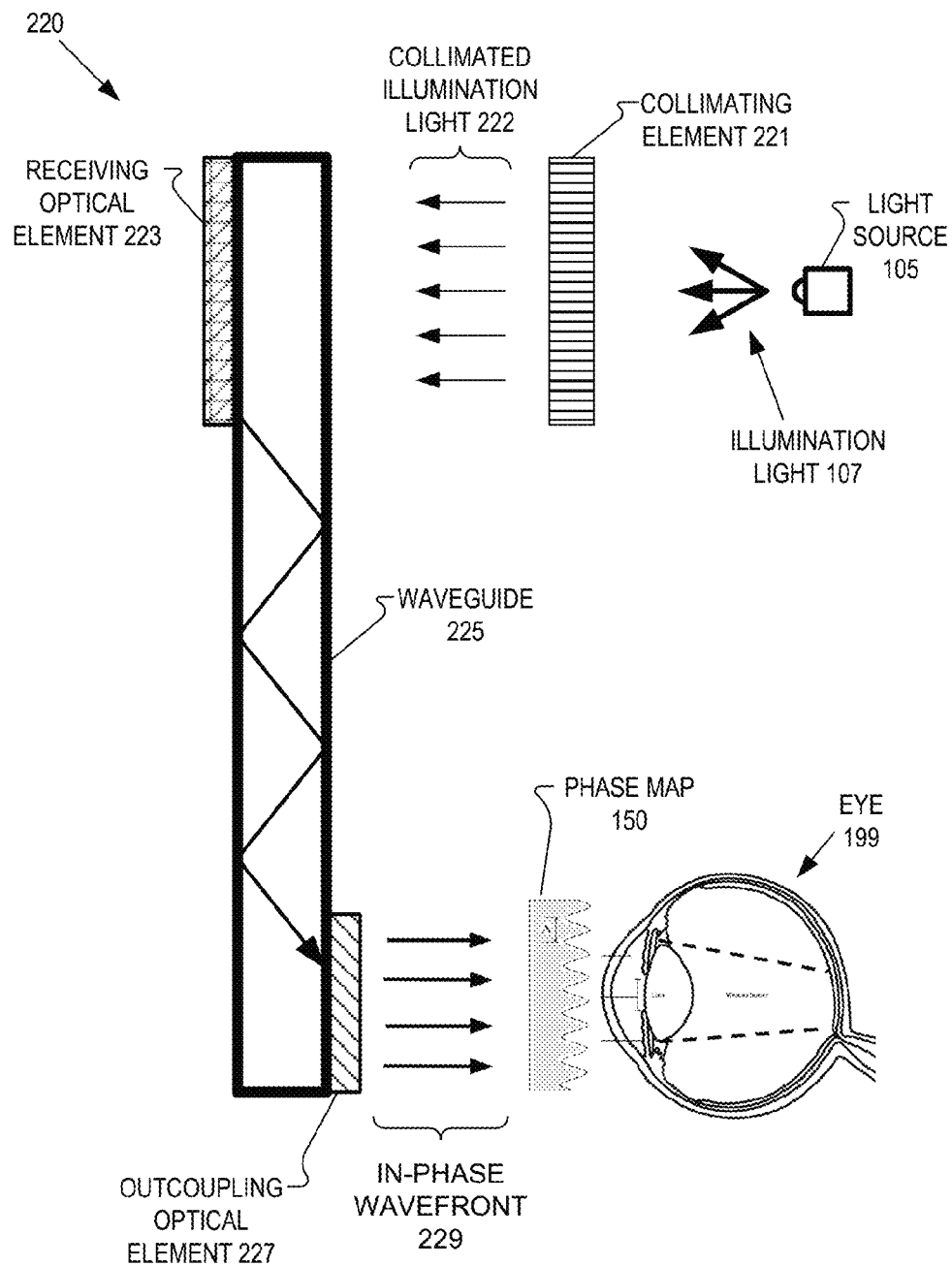
FIG. 2 illustrates an example near-eye display that includes a phase map, in accordance with an embodiment of the disclosure.

FIG. 2 illustrates an example near-eye display 200 that includes a phase map 150, in accordance with an embodiment of the disclosure. FIG. 2 shows an example optical system 220 that is one example of optical system 120. Optical system 220 includes collimating element 221, receiving optical element 223, waveguide 225, and outcoupling optical element 227. In FIG. 2, collimating element 221 is disposed between light source 105 and waveguide 225. Collimating element 221 collimates illumination light 107. Collimating element 221 includes a Fresnel lens, in one embodiment. Receiving optical element 223 receives collimated illumination light 222 and directs collimated illumination light 222 to propagate through waveguide 225. Waveguide 225 is fabricated from a suitable transparent material (e.g. acrylic). In one embodiment, waveguide is only 1 µm thick and 1 mm wide. Waveguide 225 may rely on Total Internal Reflection ("TIR") or mirror elements to guide the illumination light as the illumination light propagates through waveguide 225. In one embodiment, receiving optical element 223 includes a Bragg grating configured to redirect the illumination light so that the illumination light propagates through waveguide 225 at the proper angle (that does not violate the principles of TIR, for example). In FIG. 2, receiving optical element 223 is a reflective optical element, but it is understood that receiving optical element 223 may also be a transmissive optical element in some embodiments.

Outcoupling optical element 227 is configured to outcouple the illumination light propagating through waveguide 225 and direct the illumination light to the phase map as in-phase wavefront 229. Outcoupling optical element 227 may be a Bragg grating. Outcoupling optical element 227 is integrated into the bulk medium of waveguide 225 as a volume hologram, in one embodiment. Receiving optical element 223 may also be integrated into the bulk medium of waveguide 225 as a volume hologram. Outcoupling optical element 227 directs in-phase wavefront 229 to phase map 150 at the proper incident angle. In one embodiment, in-phase wavefront is in-phase because waveguide 225 is phase preserving and it preserves the in-phase nature of illumination light 107 generated by light source 105 (which may be approximately modeled as a point source). In one embodiment, in-phase wavefront 229 is in-phase because outcoupling optical element is phase selective and outputs only illumination light propagating in waveguide 225 that is in-phase. One important function of optical system 220 is to deliver a predictable, in-phase wavefront 129 because phase map 150 functions optimally when it is illuminated by a wavefront for which it was designed. Although in-phase wavefront 129/229 is illustrated as collimated, in-phase wavefront 129/229 may be converging or diverging, in some embodiments.

Conventional wearable near-eye displays typically include a micro-display and an image relay to direct an image formed on the display onto the eye. Near-eye displays include head mounted displays. However, this approach requires the optics (e.g. mirrors and lenses) of the image relay to direct the image to the eye without distorting the image or shifting the colors of the image because the image directed to the eye and the pixels of the micro-display have a one-to-one correspondence. Conventional wearable displays rely on amplitude modulation of the light to generate the image for viewing. The image relays to deliver an image from the micro-display to the eye are three-dimensional relays that add unwanted bulk to the wearable display. Additionally, the fabrication and assembly of precision optical components to maintain image quality adds expense to the wearable displays. In contrast, the disclosed near-eye displays utilize a phase map that does not have a one-to-one correspondence between the pixels of the phase map and the image formed directly on the retina of the eye. Rather, the entire phase map collectively modulates the phase (rather than amplitude) of the in-phase wavefront to form the image on the retina. Phase map may modulate localized amplitudes of the in-phase wavefront in addition to the phase, in some embodiments. Since the image formation happens at the phase map and image light 173 only has to travel from the phase map to the retina, a bulky and expensive three-dimensional image relay is not required to direct the image to the eye. Instead, a two-dimensional (very thin) waveguide is all that is required to guide illumination light 107 to illuminate phase map 150 because the waveguide does not need to guide image light as image light 173 is only formed after phase map 150.

Conventional near-eye displays must also spend significant optical resources on ensuring that the user/wearer of the near-eye display can actually focus on the image generated by the micro-display (e.g. LCD or LCOS). In the disclosed near-eye displays, the focusing ability (accommodation) of a human eye is not an obstructing design challenge as the real image can be formed directly onto the retina from the phase map and any required magnification can be pre-recorded directly into the phase map. Therefore, additional focusing optics are not required to allow a wearer to focus on the image and the phase map can be the last optical element that assists in forming the image onto the eye. Additionally, a user's contact lens or eye glass prescription can be included into the phase map so that the optical power required to present an image that the wearer/user perceives as in-focus is pre-recorded into the phase map. Yet another potential advantage of the disclosed near-eye displays is that phase maps are an efficient image delivery vehicle in that most (or almost all) of the light emitted by the light source is utilized to form the image. In contrast, the filters, polarizers, and liquid crystal of conventional micro-displays block or wastes a significant amount of light injected into the micro-displays to form the initial image.

As mentioned above, one way of changing the phase levels of each pixel is to vary the depth of the refractive medium of the phase map. The phase map can be fabricated using an additive process (e.g. 3D printing) that builds up the depth of each pixel as needed or fabricated using a subtractive process (e.g. etching and photolithography) that subtracts material to define the depth of each pixel. Another way to adjust the phase in each pixel is to have each pixel have the same depth, but change the refractive index of each pixel in order to advance or retard the photons of wavefront 129 propagating through the pixel. An additive process (e.g. 3D printing) may be utilized to fabricate a phase map with pixels that have different index of refraction by using a different refractive material for different pixels. Alternatively, the phase map can be made from a refractive medium (e.g. Corning PI109) that changes in response to heat or light. Then to adjust the refractive index of each pixel, the pixels can be selectively radiated with a laser (to generate heat) or light source (e.g. a UV light source) to change the refractive index of the pixel.

Figure 4A:
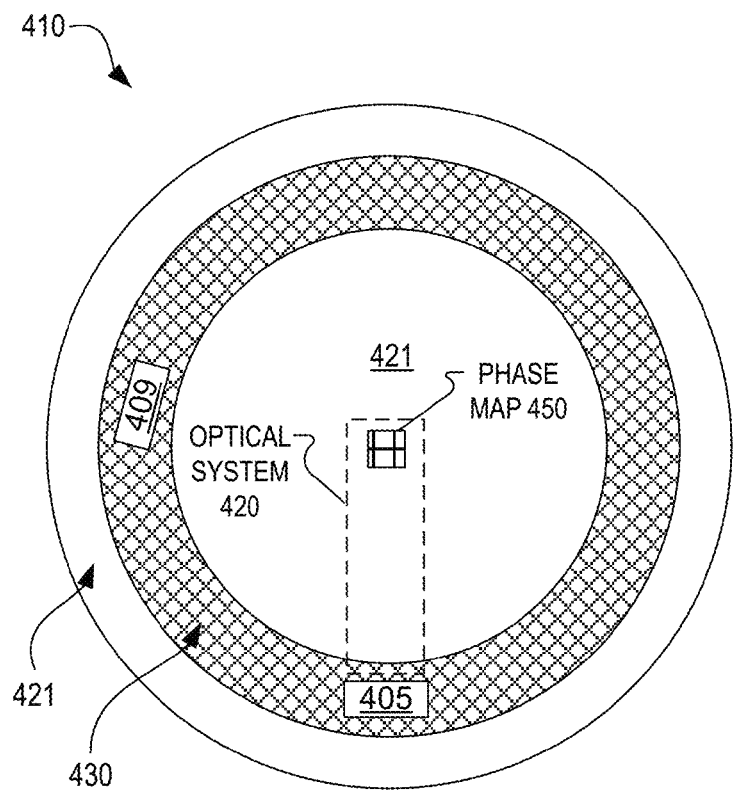
FIGS. 4A and 4B illustrate a contact lens that includes a light source and a phase map for generating an image directed into the eye of a wearer of the contact lens, in accordance with an embodiment of the disclosure.

FIG. 4A illustrates a top view of a smart contact lens ("SCL") 410 that includes control circuitry 409, light source 405, optical system 420, and phase map 450, in accordance with an embodiment of the disclosure. SCL 410 is one example of a wearable near-eye display that includes a phase map. SCL 410 includes transparent material 421 that is made from a biocompatible material suitable for a contact lens. Substrate 430 is illustrated as a substantially flattened ring disposed atop or embedded within transparent material 421. In one embodiment, the flattened ring has a diameter of about 10 millimeters, a radial width of about 1 millimeter, and a thickness of about 50 micrometers.

Substrate 430 includes one or more surfaces for mounting electrical or elements such as control circuitry 409 and light source 405. In one embodiment, substrate 430 includes a semiconductor material (e.g. silicon) and control circuitry 409 is formed in substrate 430 by way of common CMOS processes. Control circuitry 409 may be an arrangement of discrete logic or a microprocessor, for example. In one embodiment, substrate 430 includes a multi-layer flexible circuit board. In one embodiment, substrate 430 is made of a rigid material such as polyethylene terephthalate ("PET"). In one embodiment, substrate 430 is made of flexible material such as polyimide or organic material. Substrate 430 may be disposed along an outer perimeter of SCL 410 so as not to interfere with a viewable region of SCL 410 that a wearer of SCL 410 would be looking through. However, in one embodiment, substrate 430 is substantially transparent and does not substantially interfere with a wearer's view, regardless of disposition location.

Figure 4B:
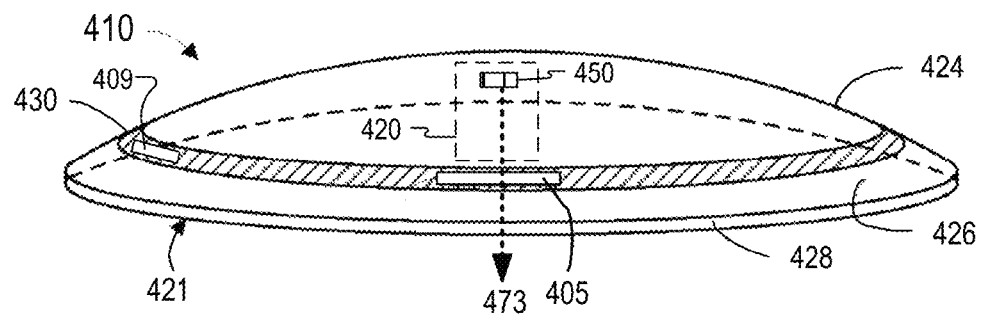

FIG. 4B illustrates a side view of a SCL 410 that includes control circuitry 409, light source 405, optical system 420, and phase map 450, in accordance with an embodiment of the disclosure. FIG. 4B shows transparent material 421 has a concave surface side 426 (eyeside) opposite a convex surface side 424 (external side). Concave surface side 426 will have substantial contact with the eye of a wearer of SCL 410. A circular outside edge 428 connects concave surface side 426 and convex surface side 424.

When control circuitry 409 activates light source 405, light source 405 injects illumination light into optical system 420 which delivers an in-phase wavefront to phase map 450. Phase map 450 diffracts the in-phase wavefront as image light 473 (by manipulating the phase of the in-phase wavefront) in an eyeward direction to form a real image on the retina of a wearer of SCL 410. SCL 410 may be weighted using similar techniques as contacts that are designed for astigmatisms to keep phase map 450 in a consistent location and maintain a spatial orientation relative to the eye so the image is formed with a specific orientation.

Figure 6A:
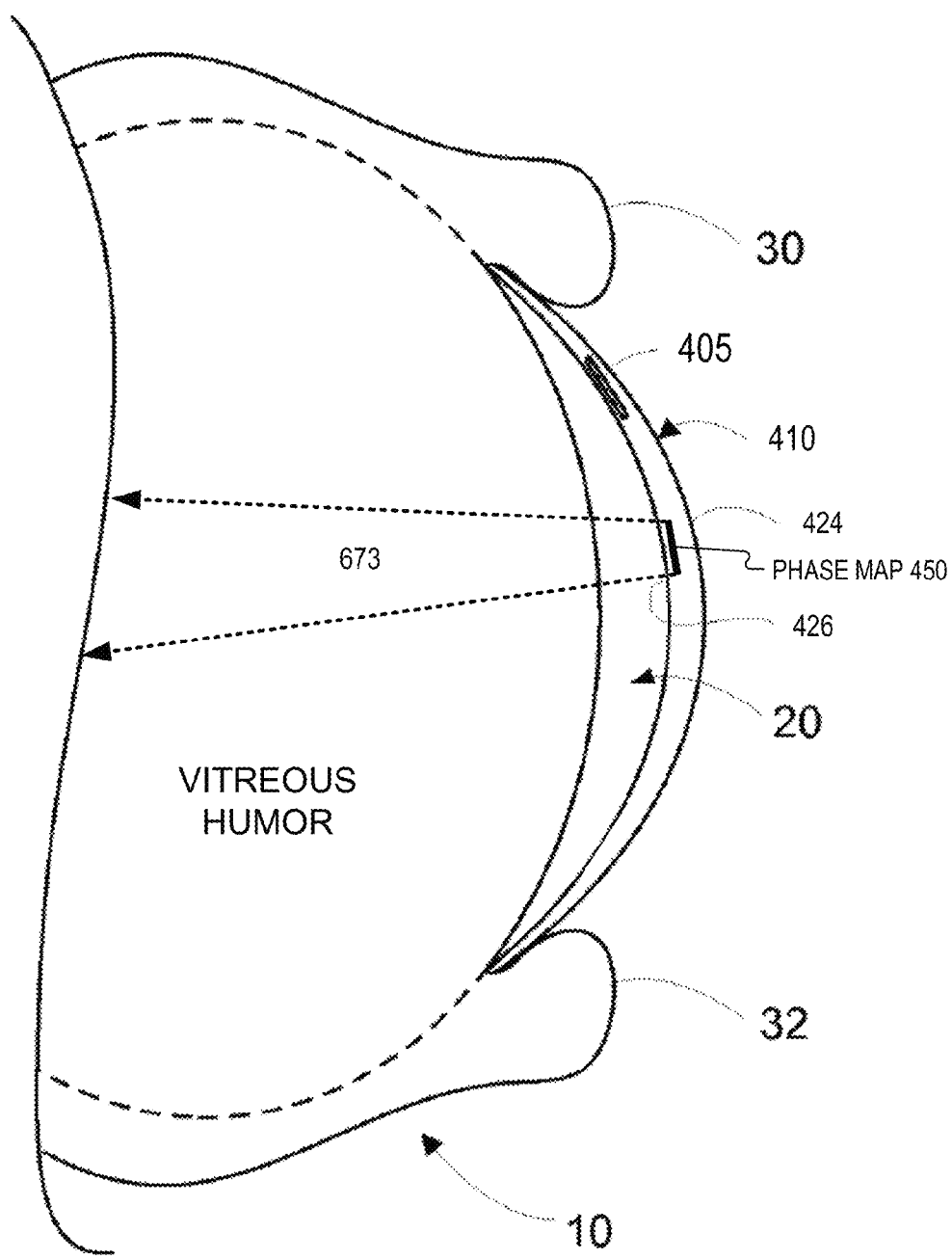
FIGS. 6A and 6B illustrate a contact lens that includes a phase map in an eye, in accordance with an embodiment of the disclosure.
Figure 6B:
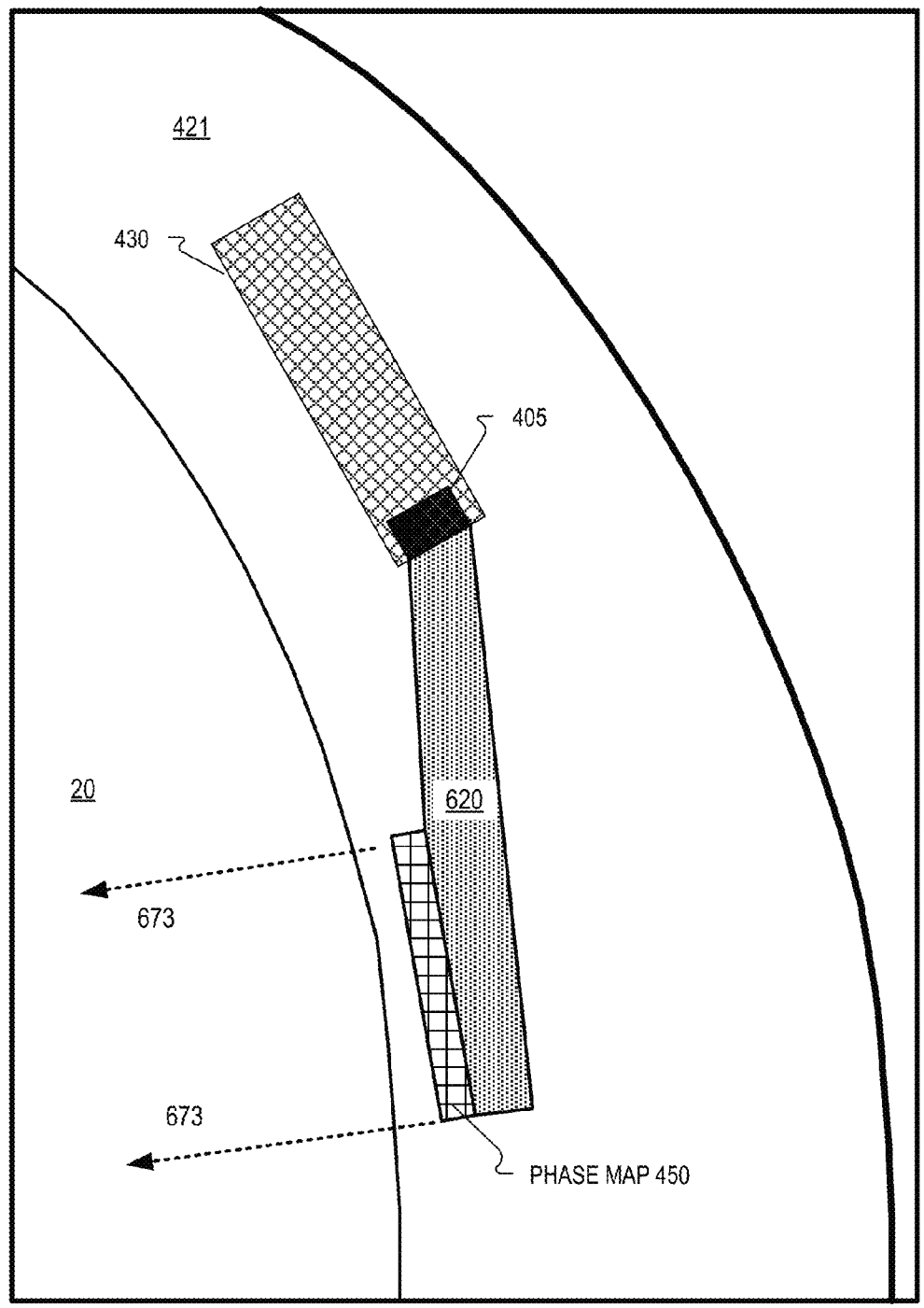

FIG. 6A illustrates a cross-section side view of an example SCL 410 mounted on a corneal surface 20 of an eye 10, in accordance with an embodiment of the disclosure. SCL 410 is shown mounted under upper eyelid 30 and lower eyelid 32. FIG. 6B illustrates a zoomed-in view of light source 405, optical system 420, and phase map 450, in accordance with an embodiment of the disclosure. Light source 405 is disposed on an inner edge of substrate 430 to inject illumination light into optical system 620. Optical system 620 delivers an in-phase wavefront to phase map 450. Phase map 450 scatters the in-phase wavefront as image light 673 in an eyeward direction to form a real image on the retina of a wearer of SCL 410.

Using the elements of near-eye display 100/200 in a contact lens offers many potential advantages. First, since image light 473/673 is formed at phase map 450, a bulky light delivery relay is not required to deliver an image from a micro-display to the eye. This allows a waveguide in optical system 620 to be very thin (two-dimensional) since it need not be designed to maintain an image propagating from a micro-display. Rather, optical system must merely deliver illumination light from light source 405 to phase map 450 as an in-phase wavefront. Additionally, phase map 450 itself can be very thin (e.g. 1 nm deep) since it modulates the phase of the in-phase wavefront rather than exclusively relying on pure amplitude modulation of light to form an image. Furthermore, modulating the phase of the in-phase wavefront also allows phase map 450 to be transparent which will be less noticeable to a wearer of SCL 410 if phase map 450 is located (at least partially) in a field of view of the wearer.

Figure 5:
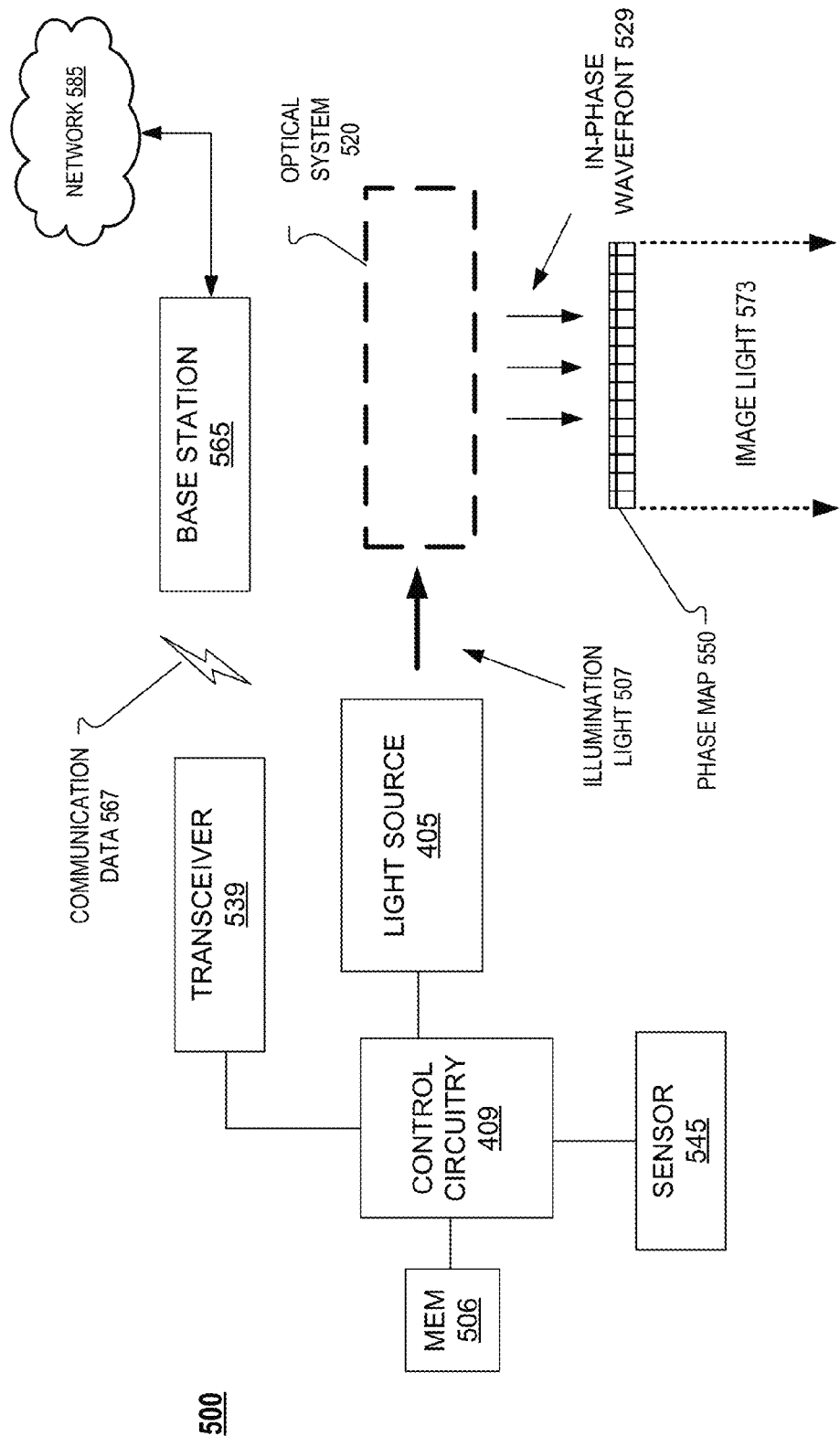
FIG. 5 illustrates a system that includes a near-eye display, in accordance with an embodiment of the disclosure.

FIG. 5 illustrates a system 500 that includes a near-eye display, in accordance with an embodiment of the disclosure. System 500 includes a near-eye display that includes light source 405, optical system 520, and phase map 550. System 500 also includes light control circuitry and logic 409, memory 506, sensor 545, and transceiver 539. System 500 also includes a base station 565 that is coupled to communicate with a network 585. Network 585 may be a wireless cellular network, Wide Area Network ("WAN"), Local Area Network ("LAN"), or otherwise. System 500 also includes a power source (not illustrated) to power the illustrated elements. The power source may include a battery and/or a photovoltaic element that generates electrical power by harvesting light.

In system 500, control circuitry 409 is coupled to light source 405 to selectively modulate illumination light 507 emitted by light source 405. To turn on light source 405, control circuitry may send a digital signal to a control terminal of a transistor that regulates the current through light source 405, for example. Control circuitry 409 is coupled to read and write to memory 506. Memory 506 may store instructions for execution on control circuitry 409. Control circuitry 409 is coupled to initiate a measurement or test by sensor 545. Sensor 545 is coupled to send the measurement or the results of the test to control circuitry 409. Sensor 545 may measure biometric data. In one embodiment, sensor 545 is a miniaturized glucose meter. Sensor 545 is disposed on substrate 430 in one embodiment of contact lens 410.

Transceiver 539 is positioned to receive communication data 567 from base station 565. Base station is a network router, in one embodiment. Control circuitry 409 is coupled to read an output of transceiver 539 and coupled to transmit data to transceiver 539 to be sent to base station 565. Communication between transceiver 539 and base station 565 may be WiFi, BlueTooth™, or other wireless communication standards or protocols. Control circuitry 409 may initiate an action in response to receiving communication data 567 from transceiver 539. For example, communication data 567 may be a digital word that instructs control circuitry 409 to activate (turn on) light source 405 in order to illuminate phase map 550 and generate an image for the eye of a user of system 500. Control circuitry 409 may also initiate a measurement using sensor 545 in response to certain communication data 567. In one embodiment, control circuitry 409 activates light source 405 to generate image light 573 in response to receiving a measurement from sensor 545 that is above or below a given threshold. Where sensor 545 is a glucose sensor, control circuitry 409 may activate light source 405 in response to a low glucose reading to form an image onto the retina of a user. The image alerts the user that her blood sugar may be low. System 500 (excluding base station 565) may be implemented into a contact lens or HMD, in accordance with embodiments of the disclosure.

Figure 7:
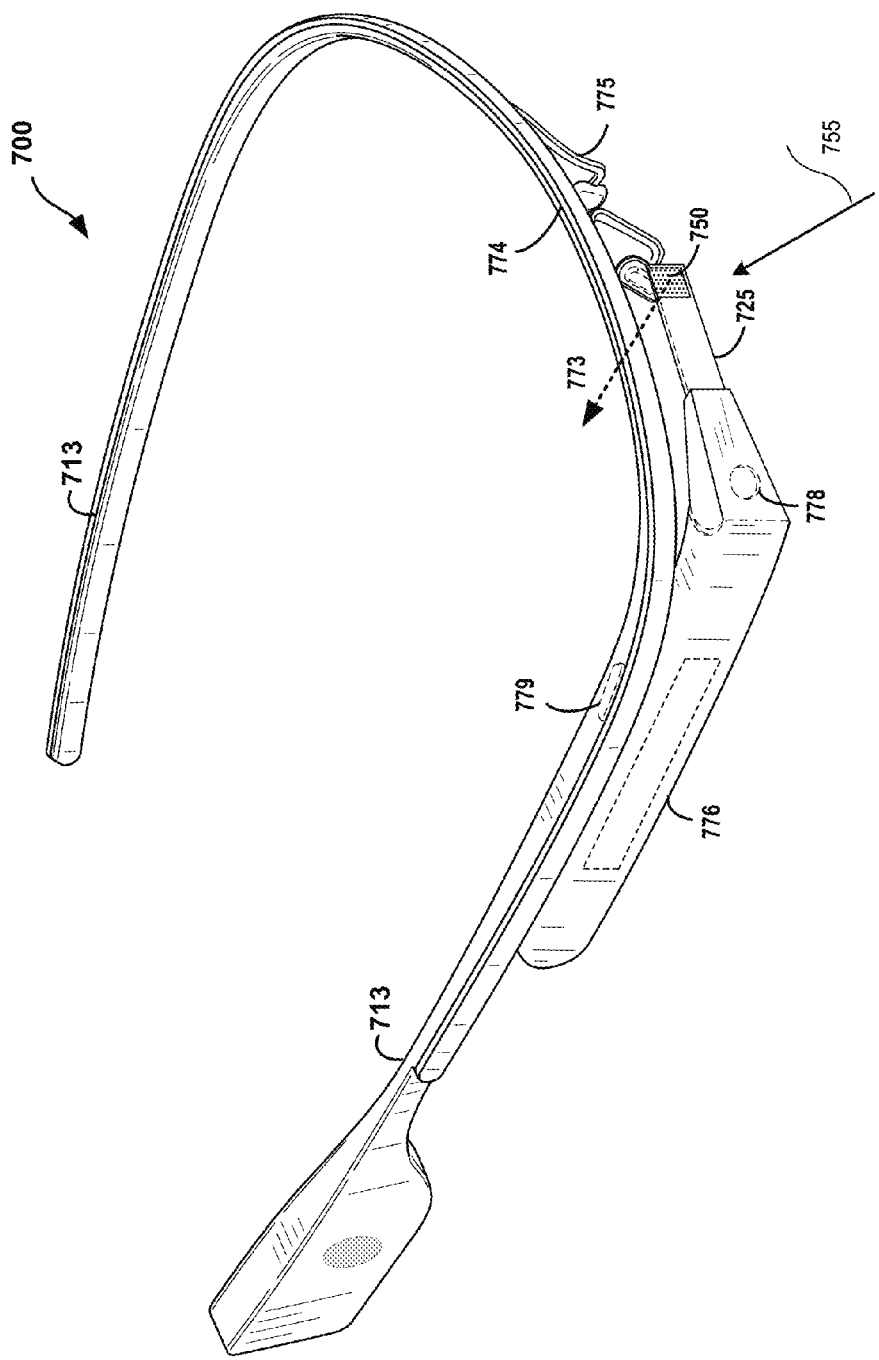
FIG. 7 illustrates a Head Mounted Display that includes a phase map, in accordance with an embodiment of the disclosure.

FIG. 7 illustrates a head mounted display ("HMD") that may integrate portions of system 500, in accordance with an embodiment of the disclosure. Example HMD 700 is a monocular HMD. HMD 700 includes side-arms 713, a center frame support 774, and a bridge portion with nose-piece 775. In the example embodiment shown in FIG. 7, center frame support 774 connects the side-arms 713. HMD 700 does not include lens-frames containing lens elements in the illustrated embodiment, but other embodiments may include lens elements. An HMD is a display device worn on or about the head. Although FIG. 7 illustrates a specific monocular HMD 700, embodiments of the present invention are applicable to a wide variety of frame types and styles (e.g. visor, headband, goggles).

HMD 700 may additionally include a component housing 776, which may include an on-board computing system (not shown), an image capture device 778, and a button 779 for operating the image capture device 778 (and/or usable for other purposes). Component housing 776 may also include other electrical components and/or may be electrically connected to electrical components at other locations within or on the HMD. Component housing 776 may include light sources (not shown) positioned to inject waveguide 725 will illumination light. As discussed previously, waveguide 725 can be include in an optical system that deliver an in-phase wavefront to phase map 750 which adjusts the phase of the in-phase wavefront to generate image light 773. Although not specifically illustrated, the components of optical system 220 may be integrated, as needed, into HMD 700 to generate image light 773 via phase map 750.

Here again, using a phase map in a near-eye display allows waveguide 725 to be very thin when compared to larger image relays in conventional HMDs. And, the illustrated embodiment of HMD 700 is capable of displaying an augmented reality to the user since waveguide 725 and phase map 750 may be transparent and permit the user to see a real world image via external scene light 755 in addition to image light 773.

Figure 8:
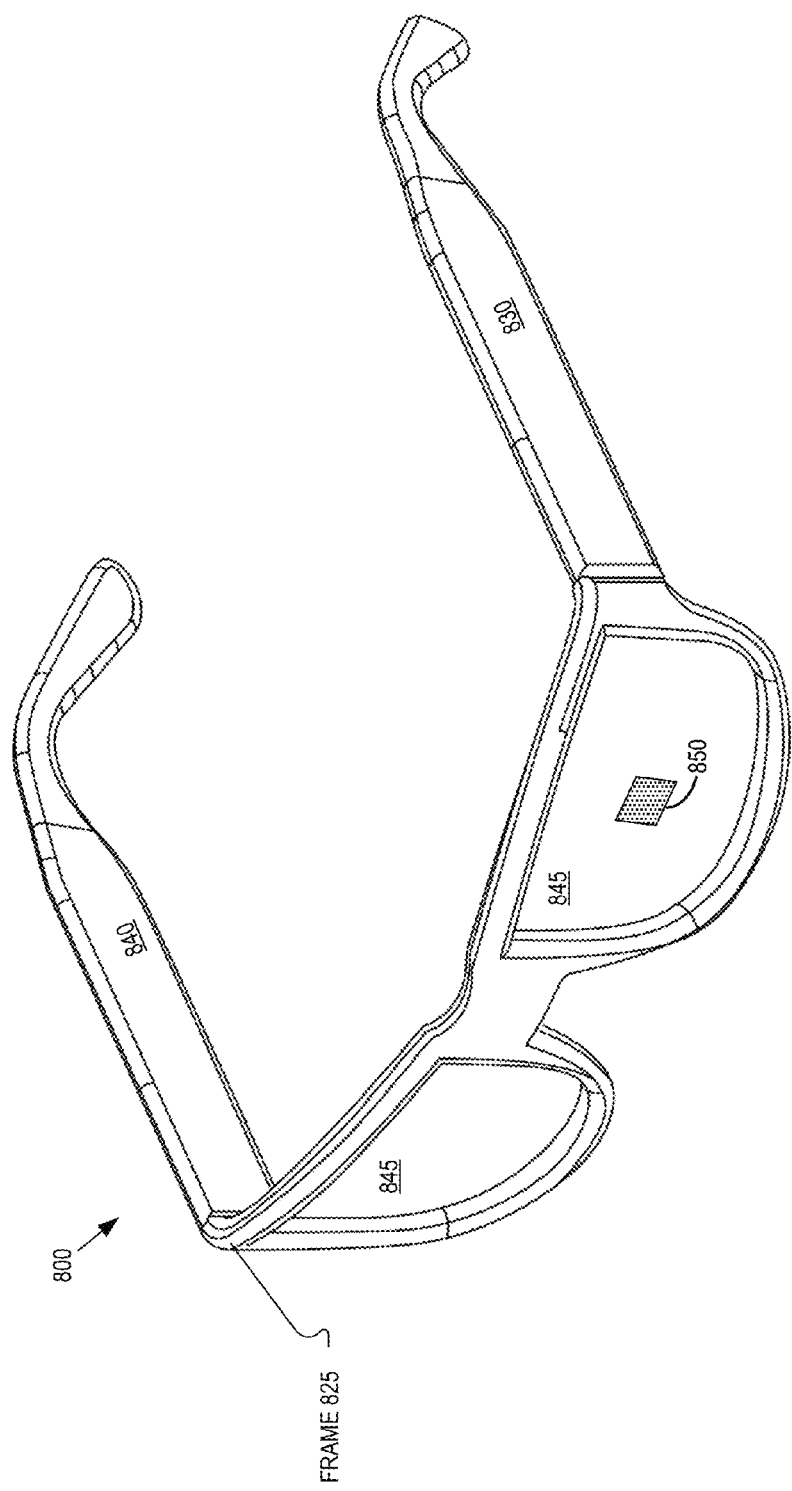
FIG. 8 illustrates eyeglasses that include a phase map, in accordance with an embodiment of the disclosure.

FIG. 8 is a perspective view of example wearable glasses 800 (one example of an HMD) that may include portions of system 500, in accordance with an embodiment of the disclosure. The illustrated embodiment of wearable glasses 800 includes lenses 845 disposed in frame 825 that includes left temple arm 830 and right temple arm 840. A phase map 850 is included with one of the lenses 845, in the illustrated embodiment. In one embodiment, both lenses 845 include a phase map and corresponding optical system to deliver an in-phase wavefront to the phase maps so that each eye receives an image from the corresponding phase map. Phase map 850 may be planar or curved according to the curvature of lens 845. Although FIG. 8 illustrates a traditional eyeglass frame 825, embodiments of the disclosure are applicable to a wide variety of frame types and styles (e.g. visor, headband, goggles). The frame 825 of eyeglasses 800 may also include other electrical components and/or may be electrically connected to electrical components at other locations within or on eyeglasses 800. Frame 825 may include light sources (not shown) positioned to inject a waveguide (not illustrated) will illumination light to illuminate phase map 850. As discussed previously, the waveguide can be included in an optical system that delivers an in-phase wavefront to phase map 850 which adjusts the phase of the in-phase wavefront to generate image light directed toward an eye of a wearer of eyeglasses 800. Although not specifically illustrated, the components of optical system 220 may be integrated, as needed, into eyeglasses 800 to generate image light via phase map 850.

Multiple phase maps 850 may be included in one lens 845 of eyeglasses 800. In one example, each of the multiple phase maps 850 in one lens 845 may have their own waveguide and light source. Each light source can be selectively activated to illuminate (via its corresponding waveguide) its corresponding phase map to selectively display different images into the eye. The multiple phase maps may be configured in the lenses 845 to increase the effective eye box of the near-to-eye display. Multiple phase maps may be incorporated into the various near-to-eye displays 410 and 700.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A contact lens comprising:
   a biocompatible material suitable to be in contact with a human eye having an eye-side opposite an external side, wherein the eye-side is curved to fit a human eye;
   a first substrate;
   a light source configured to emit illumination light, wherein the light source is coupled to or disposed within the first substrate;
   an optical system disposed to receive the illumination light from the light source and output the illumination light as an in-phase wavefront; and
   a phase map disposed to receive the in-phase wavefront output from the optical system and to adjust a phase of the in-phase wavefront to form an image at a retina-distance in response to being illuminated by the in-phase wavefront output from the optical system, wherein the phase map includes a pre-recorded phase pattern disposed across a second substrate.

2. The contact lens of claim 1, wherein the optical system includes:
   a waveguide positioned to receive the illumination light from the light source; and
   an outcoupling optical element configured to outcouple the illumination light from the waveguide to the phase map.

3. The contact lens of claim 2, wherein the illumination light is in-phase when the illumination light is received by the waveguide, and wherein the waveguide is configured to preserve the illumination light as in-phase.

4. The contact lens of claim 2, wherein the outcoupling optical element is configured to select in-phase light of the illumination light propagating through the waveguide to output as the in-phase wavefront.

5. The contact lens of claim 2, wherein the optical system further includes:
   a collimating element disposed between the waveguide and the light source, wherein the collimating element collimates the illumination light; and
   a receiving optical element configured to direct the illumination light through the waveguide, wherein the receiving optical element receives the illumination light after the illumination light propagates through the collimating element.

6. The contact lens of claim 1, wherein the phase map includes an array of transparent pixels and wherein each transparent pixel advances or retards photons in the in-phase wavefront according to the phase pattern.

7. The contact lens of claim 6, wherein each transparent pixel in the array of transparent pixels varies the phase of the photons by varying an index of refraction of the transparent pixel.

8. The contact lens of claim 6, wherein each transparent pixel in the array of transparent pixels varies the phase of the photons by varying a depth of a refractive medium of the transparent pixel.

9. The contact lens of claim 8, wherein the depth of the refractive medium for each transparent pixel is set according to discrete phase levels.

10. The contact lens of claim 6, wherein a pixel pitch of the transparent pixels in the array of transparent pixels is non-uniform.

11. The contact lens of claim 1 further comprising:
control circuitry coupled to the light source to modulate the illumination light in response to input data.

12. The contact lens of claim 11 further comprising a transceiver coupled to the control circuitry, wherein the input data is received from the transceiver.

13. The contact lens of claim 11 further comprising a sensor coupled to the control circuitry, wherein the input data is received from the sensor, and wherein the sensor is configured to measure biometric data from a wearer of the contact lens.

14. The contact lens of claim 1, wherein the contact lens is weighted to maintain a spatial orientation of the phase map in relation to the human eye.

15. A system comprising:
a base communication station configured to send wireless data; and
a smart contact lens comprising:
a transparent material having an eye-side opposite an external side, wherein the transparent material includes a biocompatible material suitable to be in contact with a human eye, and wherein the eye-side is curved to fit the human eye;
a light source configured to emit illumination light;
an optical system disposed to receive the illumination light from the light source and output the illumination light as an in-phase wavefront; and
a phase map positioned to receive the in-phase wavefront from the optical system and to adjust a phase of the in-phase wavefront to form an image at a retina-distance in response to being illuminated by the in-phase wavefront, wherein the phase map includes a pre-recorded phase pattern disposed across a substrate to that generates the image when illuminated by the in-phase wavefront; and
control circuitry coupled to modulate the light source in response to receiving the wireless data from the base communication station.

16. The system of claim 15, wherein the optical system includes:
a waveguide disposed to receive the illumination light from the light source; and
an outcoupling optical element configured to outcouple the illumination light from the waveguide toward the phase map as the in-phase wavefront.

17. The system of claim 16, wherein the illumination light is in-phase when the illumination light is received by the waveguide, and wherein the waveguide is configured to preserve the illumination light as in-phase.

18. The system of claim 16, wherein the outcoupling optical element is coupled to select in-phase light to output as the in-phase wavefront.

19. The system of claim 16, wherein the outcoupling element is integrated into a bulk medium of the waveguide as a volume or surface hologram.

20. The system of claim 15, wherein the optical system is sealed within the transparent material.

* * * * *